(No Model.)	D. L. BARNES.	2 Sheets—Sheet 2.
CAR COUPLING.
No. 478,835.	Patented July 12, 1892.
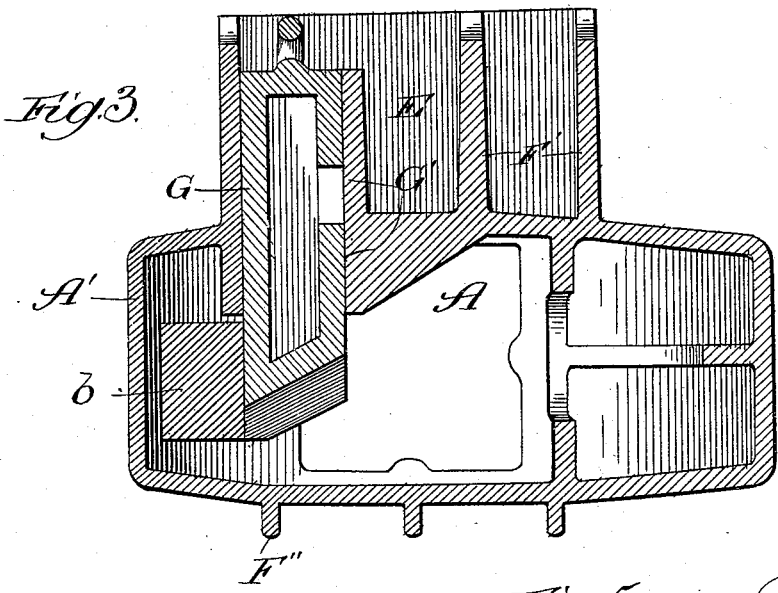
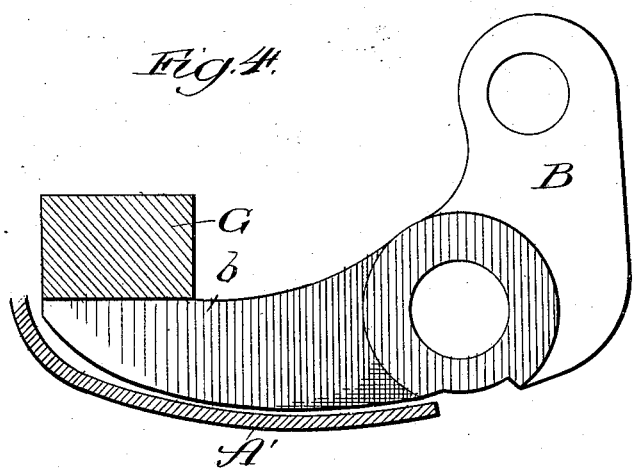
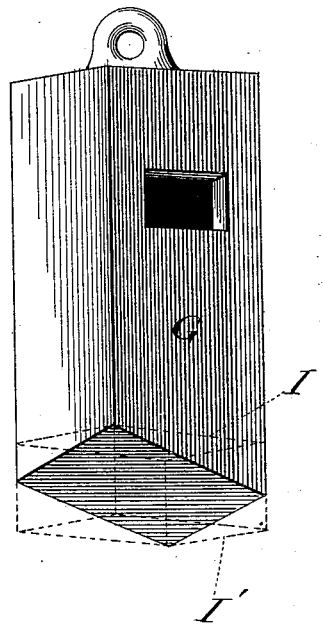

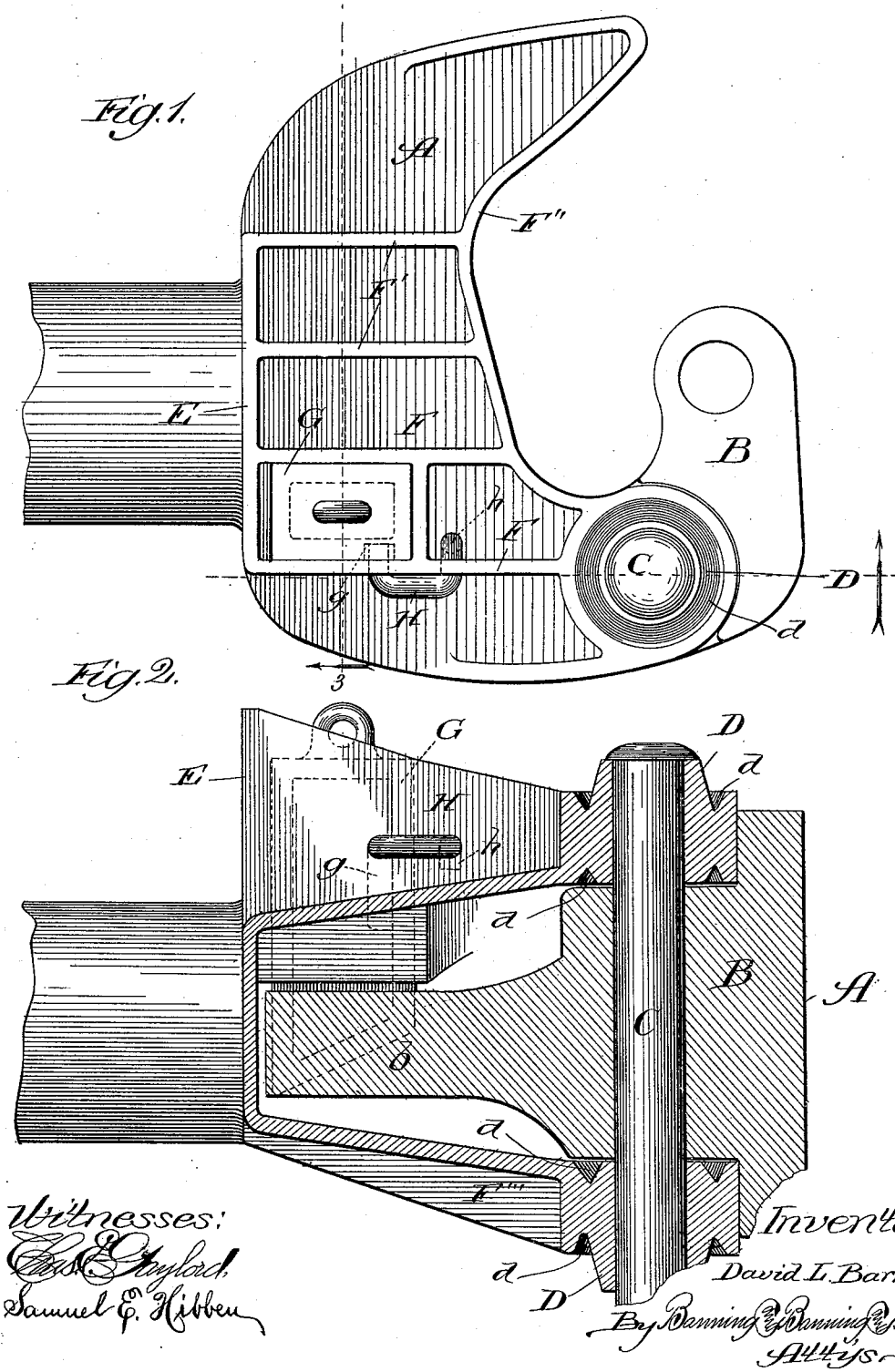

UNITED STATES PATENT OFFICE.

DAVID L. BARNES, OF CHICAGO, ILLINOIS, ASSIGNOR TO THE CONGDON BRAKE SHOE COMPANY, OF SAME PLACE.

CAR-COUPLING.

SPECIFICATION forming part of Letters Patent No. 478,835, dated July 12, 1892.

Application filed February 1, 1892. Serial No. 419,889. (No model.)

*To all whom it may concern:*

Be it known that I, DAVID L. BARNES, a citizen of the United States, residing at Chicago, Cook county, Illinois, have invented certain new and useful Improvements in Car-Couplings, of which the following is a specification.

My invention relates to vertical-hook couplers of that class which are provided with a pivoted hook; and it has for its object the modification and improvement of various parts of this coupler, as hereinafter more particularly described.

For the purpose of here explaining my invention in a general way without regard to details and not intending to limit myself in any way I may say that the invention relates, among other things, to an improved manner of supporting and holding the locking-pin, whereby all the bearings of such pin are located above the tail of the hook instead of being partly beneath the same, as has heretofore been customary, and to an improved form in which this locking-pin may be made, whereby I obtain greater contacting-surface between the pin and its bearings and between the tail of the hook and the pin, thereby increasing greatly the strength of these parts of the coupler without in any way impairing the efficiency and ease of movement of the pin. Means are provided, further, for limiting the motion of this locking-pin in a vertical plane, and thereby preventing its being entirely withdrawn from the draw-head and becoming lost. I also provide an improved form of bearing, within which is journaled the pivot-pin which supports the rotating hook and means for binding this bearing to the buffer-stop of the draw-head.

My invention consists in the features, details of construction, and combinations hereinafter described and claimed.

In the drawings, Figure 1 is a plan view of a coupler embodying my improvements; Fig. 2, a vertical section on line 2 of Fig. 1, looking in the direction of the arrow; Fig. 3, a similar section on line 3 of Fig. 1, looking in the direction of the arrow; Fig. 4, a plan detail view of the rotating hook, together with the locking-pin and a portion of the draw-head; and Fig. 5, a perspective view of the locking-pin.

The coupler may be made out of steel or any other suitable material and of any desired dimensions. The rotating hook B (shown more particularly in Figs. 2 and 4) is supported in the draw-head by means of a pivot-pin C, which pin is journaled in bearings D. These bearings, as appears in the first two figures of the drawings, are made in conical shape and are provided with annular grooves or depressions $d$. By this method of construction the bearings may be made of great strength, and yet at the same time very light, lightness, combined with strength, being among the most desirable features of these couplers.

The draw-head is provided with the usual buffer-stop E, and this buffer-stop is connected by means of a rib F with the conical pivot-bearing, and by means of similar ribs F' with the rib F'', extending around the forward face of the coupler above the opening. As shown, the lower pivot-bearing is also connected with the shank of the draw-head by means of one or more flanges F'''. By means of these flanges I reinforce and strengthen the bearings and bind them to or connect them with the buffer-stop and with the shank.

To engage with the tail $b$ of the rotating hook and lock the same, a coupling-pin G is provided. As heretofore constructed, these pins have slid up and down in bearings both above and beneath the tail of the hook in order to lock or release the same. This construction is open to various objections. Among others, it requires a nice adjustment of the parts, and in the event of the pin being bent in any manner while withdrawn from the lower bearing it is impossible to again insert it in place in such bearing. To avoid this and any other objections incidental to the use of the present construction, I support my pin in bearings G', which are located entirely above the tail of the rotating hook, the pin being withdrawn by raising it above the tail and the rotating hook being locked by lowering the pin in front of such tail. By this means I dispense with the customary lower bearing, and thereby lighten and simplify the coupler and lessen the cost of construction and the difficulty of operation. The bearings should of course be made of sufficient strength to withstand the strain, all of which will now come upon them. It has been found difficult to make the pin of sufficient strength, yet not too heavy to be readily operated, and with the present form of coupler, where all of the bearing is above the hook, it becomes of still greater importance that the pin should be made of great strength. This I have sought to accomplish and believe I have accomplished with the form of pin shown in the drawings. In this form the pin is preferably rectangular in cross-section, and is made, as shown, much larger than those heretofore in use, so as to afford a large contacting-surface both with the bearings and the tail of the hook. If made solid, this pin would be too heavy for efficiency, and therefore I prefer to make it hollow, as shown, inasmuch as this greatly reduces its weight without unduly diminishing its strength, and so far as I am aware I am the first to construct a locking-pin in this manner or to support a locking-pin, however constructed, in bearings located solely above the rotating hook. In one face of this pin, at a point preferably, though not necessarily, outside of the draw-head, I provide a recess or opening $g$, adapted to receive one end of a bolt or staple H. This staple, as shown, passes at both ends through the web F, engages with the recess at one end, and has its other end $h$ bent down to prevent the staple being accidentally removed from the web. This staple may be located at any other point desired so long as it fulfills its purpose of limiting the movement of the locking-pin in a vertical plane. The locking-pin is also beveled at its lower end to enable the tail of the rotating hook to raise and then pass beneath it, after which the pin falls by gravity into a position to engage the hook. This bevel preferably extends diagonally across the pin, the highest point of the bevel coming at one corner and the lowest point at the corner diagonally opposite. This will be obvious from an inspection of Fig. 5, where the dotted line I indicates the plane of the highest corner of the bevel and the dotted line I' the plane of the lowest corner. It is necessary to bevel the pin in this way, since from the relative position of the rotating hook and pin the tail of the former strikes the latter at one corner.

By means of the above improvements in the construction of the various parts I am enabled to produce an exceedingly simple and efficient coupler which is light, strong, and easily operated, and while I have described more or less precise forms I do not intend to limit myself exactly thereto, but contemplate changes in form, proportions, relative locations, and the substitution of equivalent members, as may be necessary or desirable.

I claim—

1. In a car-coupling, the combination of a conical pivot-bearing, a buffer-stop, both stop and bearing extending upward from the draw-head, and one or more ribs connecting such stop and bearing, substantially as described.

2. In a car-coupling, a hollow locking-pin sliding in suitable bearings in the draw-head, substantially as described.

3. In a car-coupling, the combination of a vertically-sliding locking-pin provided with a recess and a fixed staple engaging with such recess and limiting the motion of the pin in a vertical plane, substantially as described.

4. In a car-coupling, conical pivoted bearings provided with annular grooves, substantially as described.

DAVID L. BARNES.

Witnesses:
FRANK H. CLARK,
SAMUEL E. HIBBEN.